Patented Aug. 28, 1928.

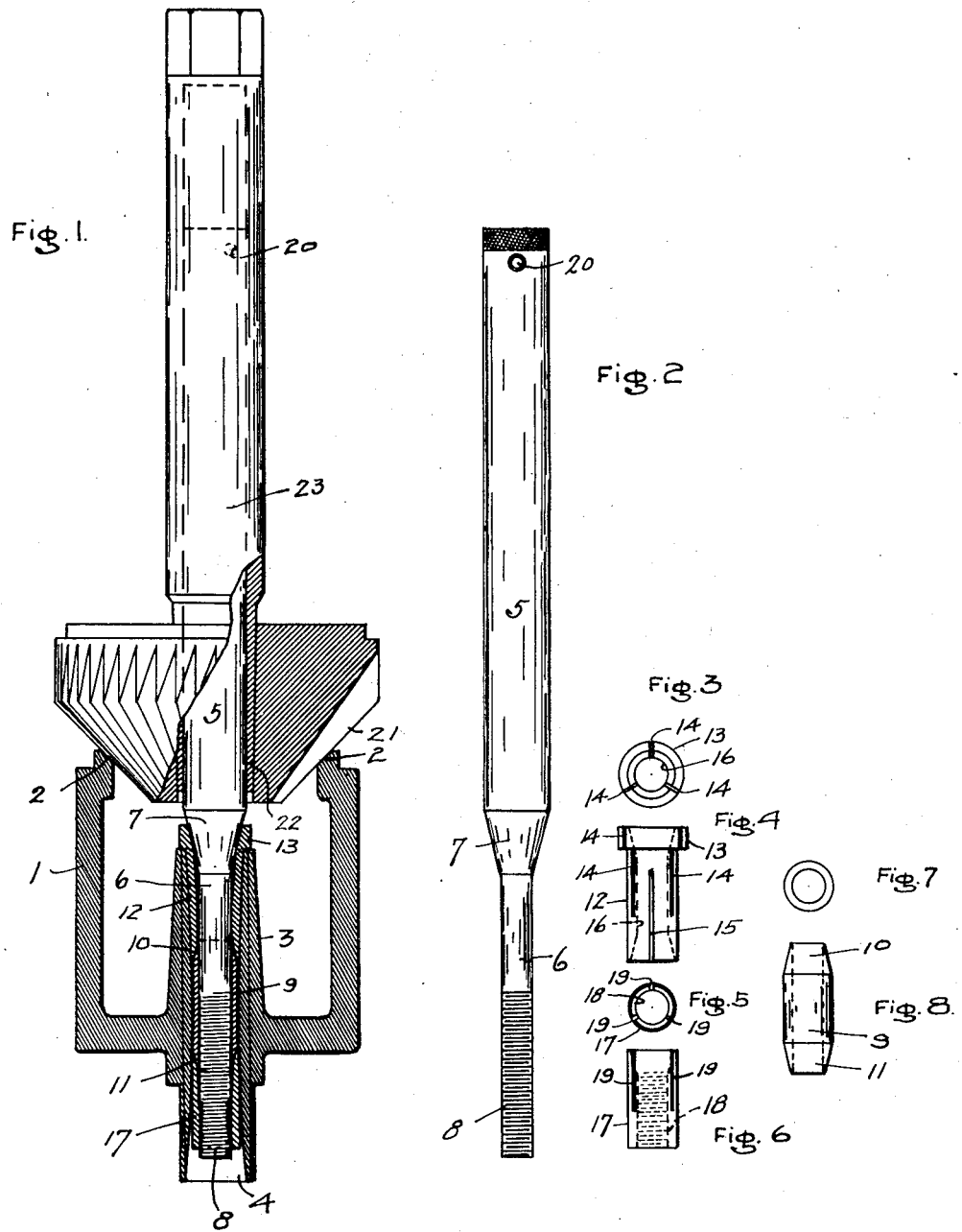

1,682,314

UNITED STATES PATENT OFFICE.

ROBERT E. WALTON, OF TACOMA, WASHINGTON.

CLAMPING DEVICE FOR VALVE-SEAT-REAMER PILOTS.

Application filed October 31, 1927. Serial No. 229,951.

This invention relates to tools for regrinding the valve-seats of gasoline engines, and for other similar purposes, and especially to the means for centering and clamping the pilot for such a tool. The object of my invention is to firmly clamp the pilot for the grinding tool in exact coaxial alinement with the axis of the valve-stem-guide. Other objects are to provide such a device, first, which is inserted complete in the valve-stem-guide from the valve end thereof; second, which is tightened and clamped entirely by the rotation of the valve end of the pilot itself; third, which will clamp the pilot in such axial position independent of the wear of the valve-stem-guide bushing; fourth, which is provided with a clamping means interposed between the pilot stem and the valve-stem-guide bushing; fifth, which grips the valve-stem-guide bushing at three separated places; sixth, which grips the pilot stem at two separated places; seventh, in which the several clamping means are independent but are interacting, whereby the rotation of the pilot acts to tighten all the clamps equally; and eighth, which is cheap to make, easy to apply, and which effectively holds the pilot, with great firmness, in a position coaxial with the valve-stem-guide.

I attain these and other objects by the devices, mechanisms, and arrangements illustrated in the accompanying drawings, in which:—

Fig. 1 is a vertical section showing my improved device in use in a valve-stem-guide which has been badly worn by use; Fig. 2 is an elevation of the pilot; Figs. 3 and 4 are plan and elevation, respectively, of the upper clamp bushing; Fig. 5 is a plan of the lower end of said upper clamp bushing and of the upper end of the clamping nut; Fig. 6 is an elevation of the clamping nut: Figs. 7 and 8 are plan and elevation, respectively, of the loose wedge sleeve.

Similar numerals of reference refer to similar parts throughout the several views.

In my application for patent for valve seat reamer pilot, filed on July 1st, 1927, under Serial Number 202,824, I secure the pilot stem to the valve-stem-guide by passing the stem through the hole in the guide, centering its upper end on the guide, and afterwards screwing a centering and clamping nut on its lower end engaging the lower end of the guide. However, it often happens that it is inconvenient to have to apply the nut to the pilot from below the valve stem guide, especially if the springs or other devices have to be removed, and I have therefore devised the following described clamping means which is assembled complete before being inserted in the valve-stem-guide, and which is tightened entirely by the rotation of the pilot itself, after it has been thus inserted in place, and which is loosened by the corresponding reversed rotation and does not require the application of heavy force to remove it therefrom, as is the case when the pilot is tapered and is driven into place.

When it has become necessary to require the valve-seat of a gasoline engine to be recut or ground, it is usually true that the valve-stem-guide bushing has become considerably worn and the hole unequally enlarged, especially at its two ends. Devices have been produced which comprise a loose split bushing, with tapered inner surface, and a correspondingly tapered stem for the pilot, the bushing being first inserted in the valve-stem-guide and then the pilot stem being driven thereinto, but it will be observed that as soon as any point of the bushing clamps in the valve-stem-guide hole, it is impossible to drive the pilot any further and therefore, when the hole is worn larger at the ends, the said bushing will grip the center of the hole only and the pilot will wobble when grinding force is applied thereto. To overcome this objection I have divided the clamping device into two bushings which are independently expanded to grip the guide hole in three different points and which grip the pilot stem at the two ends, which said bushings are operated by screwing the pilot in a nut, formed integral with one said bushing, and which slide longitudinally on the stem, as it is turned, until all the bushings grip the hole with equal force at the three points of contact, the ends of the compound device expanding to grip the worn ends of the hole while the central part expands only to grip the comparatively unworn center thereof.

Referring to the drawings, the valve cage 1 is provided with the usual valve-seat 2, and the valve-stem-guide 3 is formed integral therewith and may have a lining or bushing therein. The hole 4 of the guide 3 is formed originally with cylindrical sides but is shown in Fig. 1 as considerably worn so that its two ends are of larger diameter than the central part thereof.

The pilot comprises a main cylindrical shank 5 and a stem 6, with a tapered shoulder 7 between the said parts 5 and 6. The lower end of the stem 6 is screw-threaded at 8.

A sleeve 9 (Figs. 7 and 8), having a hole therein in which the stem 6 of the pilot fits freely, is free to slide axially on the stem 6 and to turn thereon. The two ends 10 and 11 of this sleeve 9 are tapered on their outer surface. The degree of these tapers is preferably the same as that of the shoulder 7 of the pilot.

The upper clamp bushing (Figs. 3, 4 and 5) comprises a cylindrical part 12, fitting loosely in the hole 4 of the valve-stem-guide, and provided with a shoulder or collar 13 extending around its upper end. The parts 12 and 13 are split by three slots 14 extending downward from the upper end towards the lower end thereof, and the part 12 is also provided with three other slots 15 (out of alinement with the slots 14) extending upward from the lower end thereof. The upper and the lower ends of the said bushing may be independently expanded therefore. An axial hole 16 passes through the bushing and is of such diameter as to permit the bushing to slide freely on the stem 6 of the pilot. The upper and the lower ends of said hole 16 are tapered outward to fit on the correspondingly tapered shoulder 7 of the pilot and on the upper tapered end 10 of the sliding sleeve 9, respectively.

The clamping nut (Figs. 5 and 6) comprises a cylinder 17 with a central hole 18, screw-threaded at its lower end to fit the threads 8 of the pilot stem 6. The upper part of this cylinder 17 is split with three slots 19 extending downward towards its lower end. I prefer to slightly expand this upper end of the cylinder 17 in order that the cylinder may readily enter the guide hole 4 and yet will engage the said hole with sufficient friction to hold it from turning when the pilot is turned to be screwed down in the nut 17. The upper part of the central hole 18 is tapered outward to correspond with the lower tapered end 11 of the sliding sleeve 9.

The pilot shank 5 is provided with a hole 20 adapted to receive a suitable pin whereby it may be turned when it is desired to tighten or loosen the clamps.

The cutting tool 21 is mounted on the tapered end 22 of the turning shank 23, which fits snugly on the pilot shank 5, and is free to be turned and to slide axially thereon.

My invention is assembled, first, by slipping the upper bushing 12 and the sliding sleeve 9 on the stem 6, and then by screwing the nut 17 thereon; but the said nut 17 should not be screwed up thereon sufficiently to bring the corresponding tapered surfaces into forcible contact with each other. When my invention is to be used the pilot, with the parts thus assembled thereon, is inserted in the hole 4 of the valve-stem-guide 3 as far as possible, then the pilot is turned by means of a pin in the hole 20 therein. The nut 17 comes in frictional contact with the wall of the hole 4 and therefore the stem 6 is drawn downward, or the nut 17 is drawn upward, as the pilot is thus turned. The tapered shoulder 7 is thus dawn down into the upper corresponding tapered portion of the upper bushing 12, and the bushing 12 is forced down on to the sleeve 9, and the sleeve 9 is forced down into the upper end of the nut 17. As soon as all three correspondingly tapered parts 7, 10 and 11 are in contact with the complementary parts of the bushing 12 and the nut 17, then further rotation of the stem 6 draws the two parts 7 and 17 towards each other and therefore slides the shoulder 7 or one or both of the tapered ends 10 and 11 in the said complementary parts and correspondingly expands the diameters of the parts 12 and 17 at the three points. As soon as it has been expanded at one said point to come in tight contact with the wall of the hole 4 at that point, then further rotation of the stem 6 ceases to expand that point and is effective in expanding the other two points of expansion. For instance, if the central point has first come into contact with the wall of the hole, then the bushing 12 and the sleeve 9 remain stationary while the shoulder 7 is drawn down to expand the upper part of the bushing 12 and the nut 17 is correspondingly drawn upward on the tapered end 11 of the sleeve 9 to expand its upper end. Or, if it is the upper part of the bushing 12 which has first been expanded into contact with the wall of the hole 4, then the shoulder 7 and bushing 12 do not move axially and both the nut 17 and the sleeve 9 move upward, thus expanding the upper end of the nut 17 and the lower end of the bushing 12. Thus it will be seen that the stem 6 may be rotated to tighten the clamps as long as any one of the three expanding parts has not reached its gripping contact and until all are in equal clamping strain.

Also, it is evident that the contact between the shoulder 7 and the bushing 12 centers the stem 6 in the axis of the upper part of the hole 4, while the nut 17 is centered in the lower part thereof by the expansion of its upper part; and that as soon as the stem 6 has been screwed tightly in the nut 17, the said nut will center the stem in the lower part of the hole 4. The stem 6 and the pilot are therefor centered in the axis of the valve-stem-guide hole.

Also, it is evident that the longitudinal strain applied to the stem 6, in tightly screwing it in the said nut 17, firmly clamps the stem and the pilot in such axial position.

Having, therefore, described my invention, what I claim is:—

1. A clamping device for valve-seat reamer pilot comprising a pilot having a cylindrical upper portion and a reduced screw-threaded stem; with a tapered shoulder joining the said upper part to the said stem; an expanding bushing in contact with said shoulder and lying in the valve-stem-guide; a nut on the stem and engaging the valve-stem-guide to draw the said shoulder into the bushing to expand the bushing at the shoulder, whereby the top of the stem is centered in the valve-stem-guide and the pilot is clamped therein; and expanding means engaging the lower end of the valve-stem-guide whereby the lower end of said stem is centered therein.

2. A clamping device for valve-seat reamer pilot comprising a pilot having a cylindrical upper portion and a reduced screw-threaded stem; with a tapered shoulder joining the said upper part to the said stem; an expanding bushing in contact with said shoulder and lying in the valve-stem-guide; a nut on the stem and engaging the valve-stem-guide to draw the said shoulder into the bushing to expand the bushing at the shoulder, whereby the top of the stem is centered in the valve-stem-guide and the pilot is clamped therein; expanding means engaging the lower end of the valve-stem-guide whereby the lower end of said stem is centered therein; and intermediate strain-transmitting means whereby both said expanding parts are equally strained by the screwing of the stem in the nut.

3. A clamping device for valve-seat reamer pilot comprising a pilot having a cylindrical upper portion and a reduced screw-threaded stem; with a tapered shoulder joining the said upper part to the said stem; a bushing lying in the valve-stem-guide and loosely mounted on said stem and split at its ends, whereby each end may be independently expanded, one end of said bushing adapted to contact with said tapered shoulder to be expanded thereby; a sleeve loosely mounted in said stem below said bushing and having its upper end tapered and adapted to contact with the lower end of said bushing to expand it; and a nut screwing on said stem and engaging said sleeve and the valve-stem-guide, whereby when the pilot and stem is rotated both ends of said bushing are independently expanded into contact with the valve-stem-guide to center it therein.

4. A clamping device for valve-seat reamer pilot comprising a pilot having a cylindrical upper portion and a reduced screw-threaded stem; with a tapered shoulder joining the said upper part to the said stem; a bushing lying in the valve-stem-guide and loosely mounted on said stem and split at its ends, whereby each end may be independently expanded, one end of said bushing adapted to contact with said tapered shoulder to be expanded thereby; a sleeve loosely mounted on said stem below said bushing and having its upper and lower ends tapered, the upper said tapered end being adapted to contact with the lower end of said bushing to expand it; and a cylindrical nut, screw-threaded at its lower end and split at its upper end whereby it may be expanded, said upper end being engaged by the lower tapered end of said sleeve to expand it, whereby when the pilot and stem are rotated both ends of said bushing and the upper end of said nut are all independently expanded into contact with the several parts of the valve-stem-guide to center the stem therein.

ROBERT E. WALTON.